No. 721,736. PATENTED MAR. 3, 1903.
A. E. OSBORN.
TRANSMISSION MECHANISM.
APPLICATION FILED SEPT. 3, 1901.
NO MODEL. 2 SHEETS—SHEET 1.

WITNESSES:

INVENTOR
Alden E. Osborn.
BY
ATTORNEYS

No. 721,736. PATENTED MAR. 3, 1903.
A. E. OSBORN.
TRANSMISSION MECHANISM.
APPLICATION FILED SEPT. 3, 1901.

NO MODEL. 2 SHEETS—SHEET 2.

WITNESSES:

INVENTOR
Alden E. Osborn.
BY
ATTORNEYS

UNITED STATES PATENT OFFICE.

ALDEN E. OSBORN, OF NEW YORK, N. Y.

TRANSMISSION MECHANISM.

SPECIFICATION forming part of Letters Patent No. 721,736, dated March 3, 1903.

Application filed September 3, 1901. Serial No. 74,197. (No model.)

*To all whom it may concern:*

Be it known that I, ALDEN E. OSBORN, a citizen of the United States, and a resident of the city of New York, borough of the Bronx, in the county and State of New York, have invented a new and Improved Transmission Mechanism, of which the following is a full, clear, and exact description.

This invention relates to means for transmitting motion at different speeds and in different directions.

It comprises a gearing especially adapted for use on motor-vehicles, although it may be used for other purposes. The gearing provides a braking means for the vehicle, as well as means for driving it ahead and backward at various speeds.

This specification is the specific disclosure of one form of my invention, while the claims define the actual scope thereof.

Reference is to be had to the accompanying drawings, forming a part of this specification, in which similar characters of reference indicate corresponding parts in all the figures.

Figure 1:
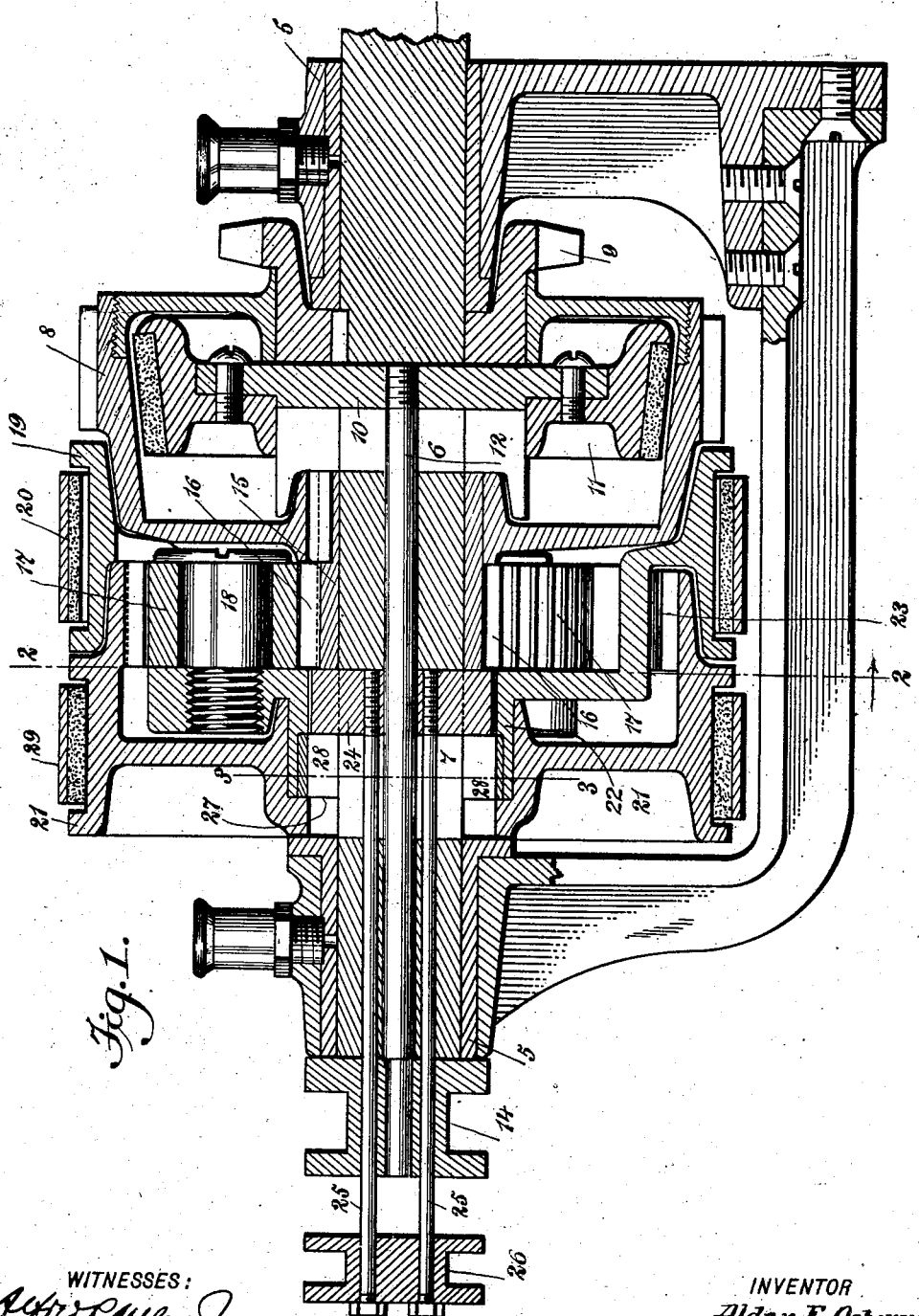
Figure 2:
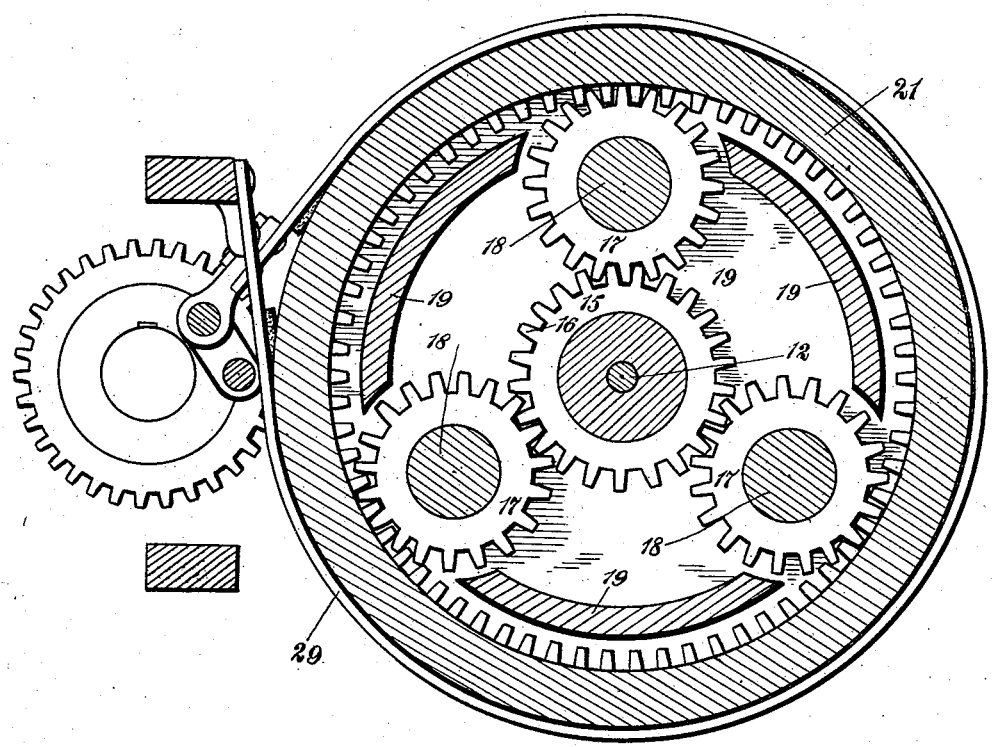
Figure 3:
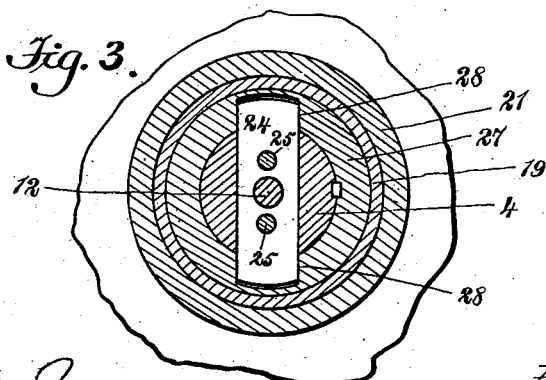

Figure 1 is a longitudinal section of the gear. Fig. 2 is a cross-section on the line 2 2 of Fig. 1, and Fig. 3 is a section on the line 3 3 of Fig. 1.

4 represents the element to be driven. This may be either the axle of the vehicle or a shaft connected therewith. As here shown, it is a shaft mounted loosely in bearings 5 and has two transverse openings 6 and 7 formed therein.

8 indicates a drum to which movement is imparted from the motor or other source of power, and 9 indicates a sprocket-wheel keyed to the shaft 4 and with which, if desired, a sprocket-chain may be engaged to drive the axle of the vehicle, assuming that the apparatus is used in this manner.

10 indicates a bar which passes transversely through the opening 6 in the shaft 4 and carries a clutch-ring 11, adapted to engage with the interior wall of the drum 8. By engaging the parts 8 and 10 together the shaft 4 will be driven directly from the drum 8, and this constitutes the high-speed forward movement of the gearing. To the bar 10 is connected a rod 12, which extends centrally through the shaft 4 and has a collar 14 attached to its outer end, by which the clutch 11 may be thrown from the inactive position (shown in Fig. 1) to its active position.

The drum 8 is keyed to a sleeve 15, which runs loosely on the shaft 4 and has a pinion 16 formed thereon. This pinion meshes with two or more pinions 17, carried, respectively, on stub-shafts 18, attached to the web of a drum 19. Over this drum works a suitable brake-strap 20, connected with a stationary part of the framing of the vehicle or other apparatus to which the invention is applied. By means of this brake 20 the drum 19 may be held against rotation.

21 indicates a drum mounted partly on the hub 22 of the drum 19 and on the shaft 4. This drum carries an internal gear-ring 23, with which the pinions 17 are meshed. The web of the drum 19 is broken away, as best shown in Fig. 2, so as to permit the pinions 17 to project into mesh with the gear-ring 23.

24 indicates a clutch which is mounted to slide in the opening 7 of the shaft 4 and is fitted freely on the rod 12. To this clutch are joined two rods 25, which extend through the shaft 4 and through the collar 14, the rods 25 carrying at their outer ends a collar 26, by which movement may be imparted to the rods and the clutch member 24, though it is normally left in the position shown.

27 indicates a collar. (See Figs. 1 and 3.) This collar is fastened rigidly on the shaft 4 and is formed with two openings 28 therein capable of receiving the clutch 24. This collar 27 turns freely within the hub of the drum 19, and consequently when the clutch 24 lies in transverse alinement with the ring or collar 27 the clutch is out of engagement with both of the drums 19 and 21. The collar 27 serves principally to increase the bearing-surface of the drum 19 on the shaft 4. At the right-hand side of the collar 27 the hub of the drum 19 is recessed to receive the clutch, whereby this drum may be fastened to the shaft 4, and at the left-hand side of the collar 27 the hub of the drum 21 is recessed, so as to receive the clutch 24, and thus fasten the drum 21 to the shaft 4. When the drum 21 is fast to the shaft, the drum 19 is loose, and vice versa.

29 indicates a brake-strap which works on the drum 21 the same as the strap 20.

Assuming that the drum 8 was being driven ahead in order to drive the shaft 4 at full speed, the clutch 11 should be engaged with the drum, thus connecting the drum 8 directly with the shaft 4. To reduce the speed and yet drive the shaft 4 forward, the clutch 11 should be thrown out of operation. The brake-strap 29 should then be tightened on the drum 21, thus holding the drum stationary with respect to the parts 8 and 4. The result of this movement since the clutch 24 is normally in the position shown is that as the drum 8 and gear 16 turn they will drive the pinions 17, and these pinions being meshed with the stationary gear-ring 23 will react on the shafts 18, and thus, through the medium of the clutch 24, drive the shaft 4 forward, but at a reduced speed, depending obviously upon the ratio between the various gear elements involved.

To drive backward, the brake 29 should be relaxed and the clutch 24 should be thrown over to its leftwardmost position, thus fastening the drum 21 to the shaft 4 and releasing the drum 19. The brake 20 should then be tightened, holding the drum 19 stationary with respect to the various parts of the gearing. Movement from the drum 8 will now turn the gear 16, and the drum 19 and shafts 18 being held stationary the gears 17 will turn around their axes and will impart a backward rotary movement to the drum 21, which in turn will drive the shaft 4 through the clutch 24.

The manner of applying the invention will be readily understood by all persons skilled in the art, and various changes in minor features and details of the apparatus may be resorted to at will—such, for example, as modifications in the forms of clutches or the size and arrangement of the gears—as long as the vital principle is retained as specified in the claims.

When the parts are not working, the brake-strap may be applied to the drum which is locked to the shaft, thus making it possible to use the apparatus as a means for controlling the movement of the vehicle itself—that is to say, as an ordinary brake. Assuming that the parts are in the adjustment shown in Fig. 1, the strap 29 being loosened, the strap 20 may be at any time applied to the drum 19, thus retarding, or even stopping, the movement of the shaft and of the parts connected thereto.

Having thus described my invention, I claim as new and desire to secure by Letters Patent—

1. The combination of a driving part, a driven part, a means for holding the two stationary in relation to each other, two rotary drums turning around the driven part, a means for connecting either one of said drums to the driven part to turn therewith, a gear on one drum, a pinion mounted loosely on the other and meshing with the gear on the first drum, a gear connected to turn with the driving part and in mesh with the pinion, and means for stopping the movement of either of the drums.

2. The combination of a rotary shaft, a driving member arranged to turn around it, a means for holding the driving member stationary with the shaft, two drums mounted on the shaft, means for connecting either of the drums with the shaft, means for holding either drum against rotation, an internal gear formed on one drum, a pinion mounted loosely on the other drum and meshed with the internal gear, and a gear connected with the driving member and meshed with the pinion.

3. The combination of a rotary shaft, a driving member mounted loosely thereon, a clutch for holding the driving member stationary with the shaft, two drums mounted on the shaft, a clutch for connecting either of the drums with the shaft, an internal gear formed on one drum, a pinion carried on the other drum and meshed with the internal gear, a gear in connection with the driving member and meshed with the pinion, and a brake for each drum.

4. The combination of a driving part, a driven part, a releasable means for holding the two together, two drums, coacting gears carried respectively on the drums, a gear in connection with the driving part and meshed with one of the other gears, means for fastening each drum to the driven part, and a brake for each drum, for the purpose specified.

5. The combination of a driving part, a driven part, a releasable means for holding the two together, two rotary members, coacting gears carried respectively on said members, a gear in connection with the driving part and meshed with one of the other gears, means for connecting either of said members to the driven part, and means for holding either of said members stationary.

6. The combination of a driving part, a driven part, a releasable means for holding the two together, two drums, coacting gears carried respectively on the drums, a gear having connection with the driving part and meshed with one of the other gears, means for fastening each drum to the driven part, and a brake for each drum, for the purpose specified.

7. The combination of a driving part, a driven part, means for holding the two together, two rotary drums turning around the axis of the driven part, a means for connecting either one of said drums to the driven part to turn therewith, a gear on one drum, a second gear mounted loosely on the other drum and meshing with the gear on the first drum, a gear connected to turn with the driving part and in mesh with the second gear, and means for arresting the movement of either of the drums.

8. The combination of a driving part, a driven part, means for holding the driving member stationary in relation to the driven member, two drums mounted to turn on the driven member, means for connecting either of the drums with the driven member, means for arresting the movement of either drum, a gear on one drum, a second gear mounted loosely on the other drum and meshed with the first-named gear, and a gear connected with the driving member and meshed with the second-named gear.

9. The combination of a rotary shaft, two drums mounted to turn around it, means for connecting either of said drums with the shaft, means for arresting the movement of either drum, gears carried respectively on the drums and meshed together, a constantly-driven gear meshing with one of the first-named gears, and releasable means for connecting the rotary shaft with said constantly-driven gear.

10. The combination of a rotary driven member, two drums arranged to turn around the axis thereof, means for connecting either of said drums to the said driven member, means for holding either drum against rotation, an internal gear on one drum, a pinion carried on the other drum, said pinion projecting through an orifice in the web of the drum on which it is carried to mesh with the internal gear, and a constantly-driven gear meshing with the pinion.

11. The combination of a driving part, a driven part in the form of a rotary shaft, two drums mounted on the shaft, coacting gears carried respectively on the drums, a gear connected with the driving part and meshed with one of the first-named gears, means for fastening either of said drums to the shaft, operating devices for said means, the operating devices extending loosely through the shaft, and means for arresting the movement of either drum.

12. The combination of a driving part, a driven part in the form of a rotary shaft, two drums mounted on the shaft, coacting gears carried respectively on the drums, a gear connected with the driving part and meshed with one of the first-named gears, means for fastening either of said drums to the shaft, operating devices for said means, the operating devices extending loosely through the shaft, means for arresting the movement of either drum, means for holding the driving part and shaft together, and operating devices for said latter means, said operating devices also extending loosely through the shaft.

13. The combination of a driving part, a driven part in the form of a rotary shaft, two drums mounted on the shaft, coacting gears respectively carried on the drums, a gear connected with the driving part and meshed with one of the first-named gears, a clutch mounted on the shaft and movable from one drum to the other to fasten either drum to the shaft, operating devices for the clutch, the operating devices extending loosely through the shaft, and means for arresting the movement of either drum.

14. The combination of a driving part, a driven part in the form of a rotary shaft, a clutch for holding said parts together, operating means for the clutch, the operating means extending loosely through the shaft, two drums mounted to turn on the shaft, means for connecting either drum to the shaft, means for arresting the movement of either drum, coacting gears carried respectively on the drums, and a gear in connection with the driving member and meshed with one of the first-named gears.

In testimony whereof I have signed my name to this specification in the presence of two subscribing witnesses.

ALDEN E. OSBORN.

Witnesses:
JOHN H. GRATACAP,
W. W. OSBORN.